United States Patent [19]

Kemp et al.

[11] 4,150,548

[45] Apr. 24, 1979

[54] POLLUTANT REMOVAL FROM PYROLYTIC GASES BY CENTRIFUGE AND MOLECULAR SIEVES

[75] Inventors: Klaus M. Kemp, Santa Barbara; Jack E. Lehman, Torrance, both of Calif.

[73] Assignee: Kemp Reduction Corporation, Santa Barbara, Calif.

[21] Appl. No.: 735,598

[22] Filed: Oct. 26, 1976

[51] Int. Cl.² ............................................. F25J 3/08
[52] U.S. Cl. .................................. 62/18; 55/389; 55/68; 55/75; 62/23; 62/40; 201/30
[58] Field of Search ............... 62/18, 40, 23; 201/30; 55/389, 75, 68, 70, 73

[56] References Cited

U.S. PATENT DOCUMENTS

| | | | |
|---|---|---|---|
| 3,092,461 | 6/1963 | Arend et al. | 62/18 |
| 3,315,477 | 4/1967 | Carr | 62/40 |
| 3,653,220 | 4/1972 | Foster | 62/18 |
| 3,970,524 | 7/1976 | Funk | 201/30 |

*Primary Examiner*—Norman Yudkoff
*Attorney, Agent, or Firm*—Ralph B. Pastoriza

[57] ABSTRACT

Gaseous products produced by pyrolytic conversion of materials are treated in a series of stages in a closed system by progressively subjecting the gaseous products to decreasing temperatures ranging from near ambient to cryogenic. Removal and storage of pollutants from the gaseous products is accomplished by condensation resulting from cooling, physical separation by subjecting the gaseous products to centrifugal forces, sub-cooling of the gaseous products, and chemical adsorption by molecular sieves, these operations being carried out in the various stages.

5 Claims, 5 Drawing Figures

POLLUTANT REMOVAL FROM PYROLYTIC GASES BY CENTRIFUGE AND MOLECULAR SIEVES

This invention relates to gas pollution control and more particularly to a method and system of treating and removing pollutants from gaseous products produced by pyrolytic conversion of waste material.

BACKGROUND OF THE INVENTION

In U.S. Pat. No. 3,945,890 issued Mar. 23, 1976, and in copending patent application Ser. No. 648,050 filed Jan. 12, 1976 now U.S. Pat. No. 4,052,265 issued Oct. 4, 1977, there is disclosed a converter system for the pyrolytic conversion of organic and pseudo-organic materials under near ambient, non-oxidative atmosphere, and minimum temperature conditions. Depending upon the nature and chemical make-up of the material being converted, gaseous products may be produced which would be considered pollutants if released to the atmosphere. While the converter described in the foregoing patent greatly minimizes the types and amounts of pollutants produced, it is frequently desirable to eliminate all negative environmental impact.

It is known to treat such gaseous products to avoid atmospheric pollution by simple combustion of the gases and/or use of chemical scrubbers, electrostatic precipitators, and the like. However, none of the presently available systems of which we are aware will effectively remove all of the gaseous pollutants.

BRIEF DESCRIPTION OF THE PRESENT INVENTION

With the foregoing in mind, the present invention contemplates a method and system for gas pollution control which, in its preferred embodiment, is designed for use with the converter system of the type described in the heretofore referred to U.S. Pat. No. 3,945,890.

In accord with the basic method of this invention, the gaseous products produced by the pyrolytic conversion of materials are first cooled below the dew point of condensable vapors; the cooling temperature is near ambient temperature and the pressure in this initial step is near ambient pressure. After the basic cooling step, the gaseous products are guided and accelerated along curved paths to physically separate by centrifugal forces particulate and droplet agglomerations of pollutants. The remaining gaseous products are then subject to a series of sub-cooling steps to cryogenic temperatures. In the final basic steps, the sub-cooled gaseous products are passed through appropriate adsorbing chemical beds for removing the last remnants of pollutants.

The method also includes appropriate steps for collecting for reuse separated pollutant products from the gaseous products occurring during the cooling, separating, sub-cooling and adsorption of the gaseous products.

The preferred apparatus or system for carrying out the method comprises a series of insulated, serially connected equipment stages having an entrance end for receiving, guiding and confining the gaseous products, and an exit end from which pollutant free fuel gas may be drawn for storage or reuse. Various ones of the successive stages are provided with appropriate accumulators for collecting pollutant products separated from the gaseous products. A booster pump means is provided for imparting a flow rate to the gaseous products through the series of equipment stages and novel cooling means are provided associated with the series of stages for progressively cooling the gaseous products passing through the stages from a near ambient temperature to cryogenic temperatures. This progressive cooling progressively removes energy from the gaseous product stream to thereby enhance the separation and accumulation of various gases and pollutant products.

BRIEF DESCRIPTION OF THE DRAWINGS

A better understanding of this invention will be had by referring to the accompanying drawings in which.

DETAILED DESCRIPTION OF THE INVENTION

Figure 1:
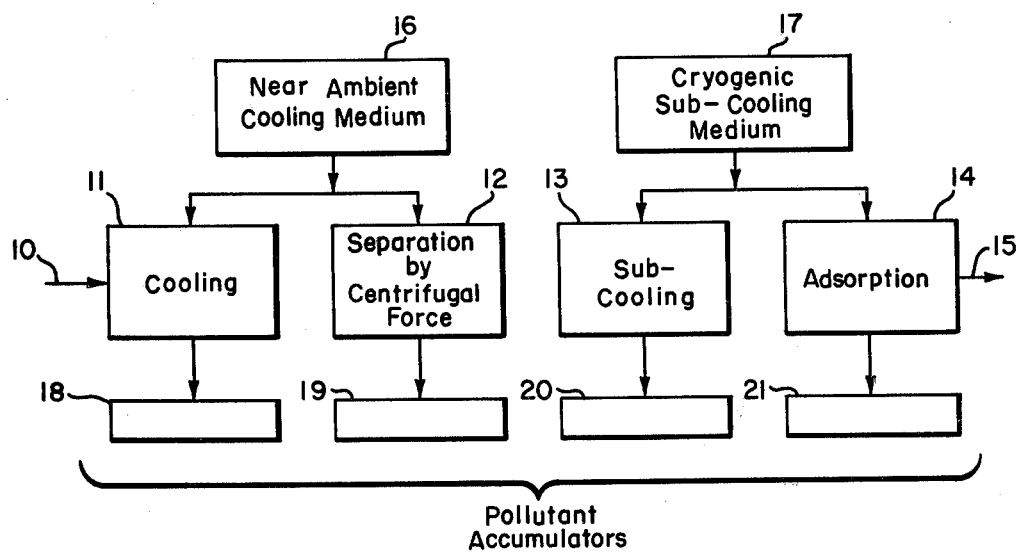
FIG. 1 is a simplified basic block diagram illustrative of basic method steps in accord with this invention.

Referring first to FIG. 1, basic method steps in accord with this invention are illustrated by the various blocks. Thus, the gaseous products produced by pyrolytic conversion of materials such as occurs in the converter system described in the heretofore referred to U.S. Pat. No. 3,945,890, enter the system as indicated by the arrow 10 wherein they are subject to an initial cooling indicated by the block 11. The cooling takes place at a temperature below the dew point of various condensable vapors in the gaseous products. The gas stream is then guided and accelerated to effect physical separation by centrifugal forces of particulate and droplet agglomerations of pollutants as indicated by the block 12. In the next step, the gaseous products are subject to sub-cooling indicated by the block 13 and thence there is effected a chemical adsorbing of pollutant remnants as indicated by the block 14. At the end of the process, there is available for use or storage clean fuel gas as indicated at the outlet by the arrow 15.

The progressive cooling is accomplished by a near ambient cooling medium depicted by the block 16 and by cryogenic subcooling mediums indicated by the block 17. This cooling thus takes place from a near ambient temperature relative to the temperature of the incoming gases to cryogenic temperatures. Also indicated are pollutant accumulators 18, 19, 20 and 21 for storing pollutant products resulting from the cooling, separation, sub-cooling and adsorption of the gaseous products being treated.

Figure 2:
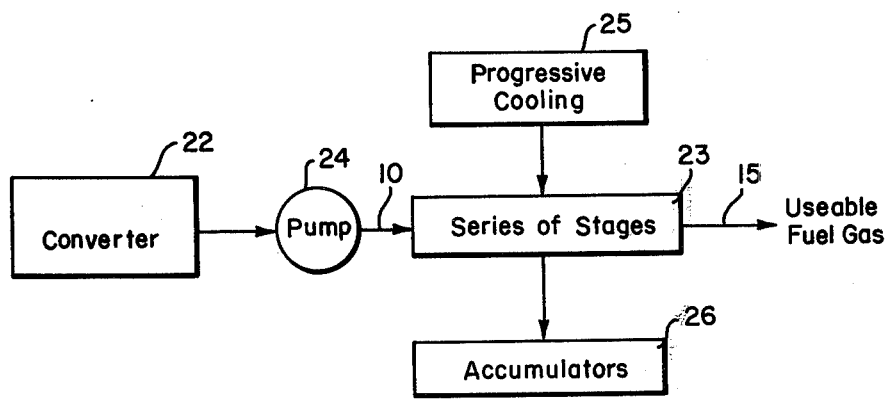
FIG. 2 is a simplified block diagram of an apparatus or system for carrying out the method in accord with the invention.

Referring to FIG. 2, the block diagram illustrates the basic components for carrying out the method steps described in FIG. 1. Thus, in FIG. 2 there is shown a converter 22 which may be of the type described in the heretofore mentioned U.S. Pat. No. 3,945,890. A series of equipment stages indicated by the block 23 has an entrance end again indicated by the arrow 10 for receiving the gaseous products from the converter after the same have been guided and accelerated by an appropriate booster pump means 24. The progressive cooling apparatus is indicated by the block 25 and appropriate accumulators by the block 26. The outlet from the series of stages providing usable fuel gas is again indicated by the arrow 15.

Figure 3:
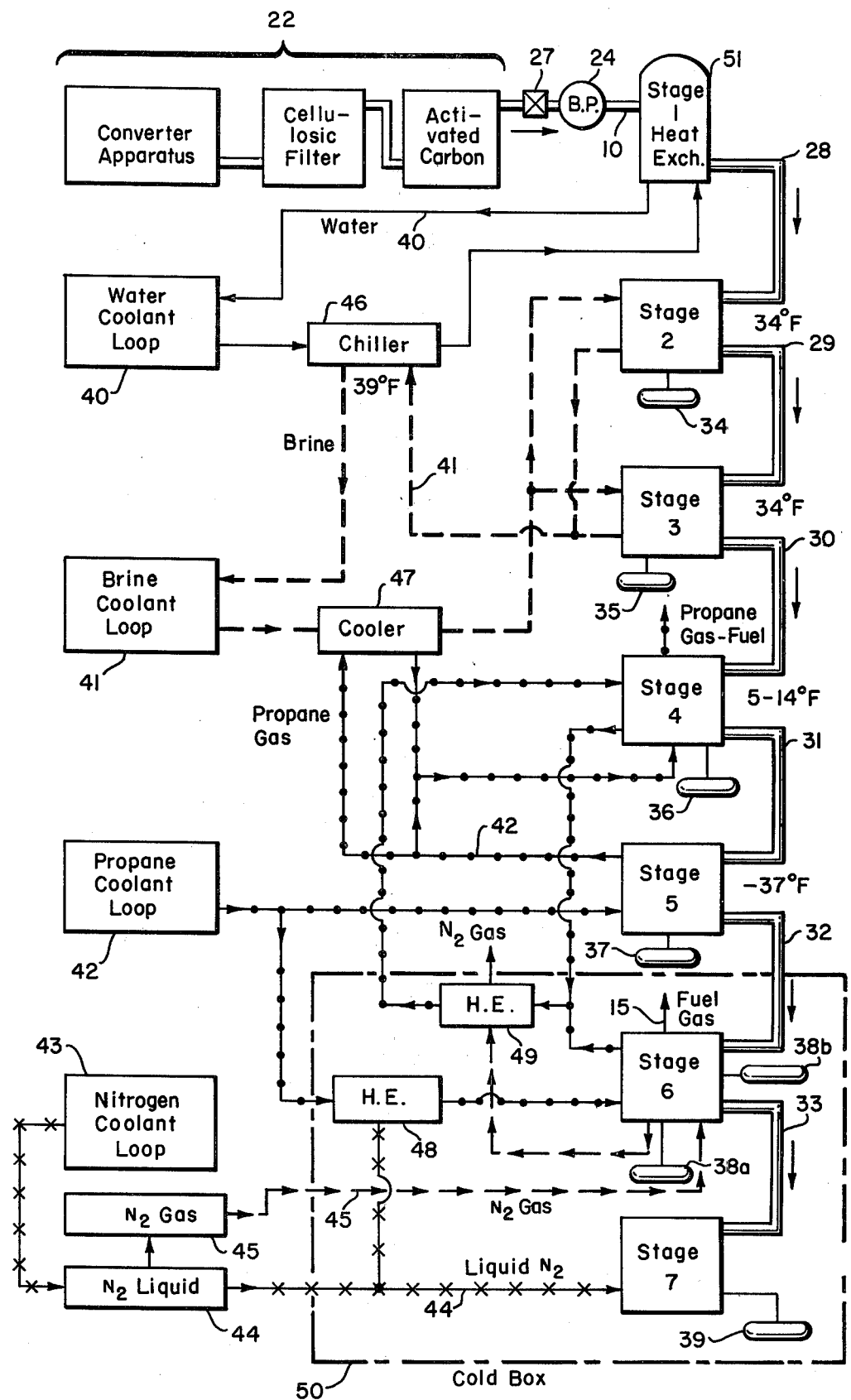
FIG. 3 is a more detailed block diagram of the preferred embodiment of the system of this invention.

Referring now to FIG. 3, the complete system briefly indicated by the block diagram of FIG. 2 will be described. Thus, referring to the upper portion of FIG. 3, the converter 22 includes a converter apparatus from which gaseous products flow into a cellulosic filter and thence through an activated carbon bed. The latter two components constitute a pre-treating stage and are included in the teachings of the heretofore referred to U.S. Pat. No. 3,945,890.

The criteria of operation of the activated carbon is defined by the Biot number. This Biot number is proportional to the bed heat transfer coefficient times the radius of the activated carbon bed divided by the thermal conductivity of the wetted composite bed, and may range between 0.15 and 27.5 depending upon the gaseous products being processed.

Still referring to the upper portion of FIG. 3, the gaseous products are passed by flow valve 27 through the booster pump means 24 into the series of equipment stages entering the entrance pipe 10 corresponding to the inlet arrow 10 of FIG. 1.

In the preferred embodiment, there are provided seven stages which are numbered as illustrated on the right side of FIG. 3, these stages being serially connected by closed conduits or piping 28, 29, 30, 31, 32 and 33. The pollutant product accumulators briefly described heretofore associated with various ones of the stages are indicated at 34 for stage 2, 35 for stage 3, 36 for stage 4, 37 for stage 5 and 38a and 38b for stage 6. In the next-to-last stage 6, the outlet or exit of clean fuel gas again indicated by the same numeral 15 is illustrated while further pollutant remnants are collected in stage 7 and stored in accumulator 39.

The booster pump means 24 leading into the first stage imparts a flow rate of the gaseous products through the series of equipment stages.

The progressive cooling of the various stages is illustrated by the blocks on the left side of FIG. 3 and include a water coolant loop 40, a brine coolant loop 41, a propane coolant loop 42 and a nitrogen coolant loop 43. The nitrogen cooling loop 43 includes both liquid nitrogen indicated at 44 and nitrogen gas indicated at 45.

Progessively cooler temperatures result from a cascading of the various coolant loops. In addition, maximum thermal efficiency is realized by providing a heat exchanger or chiller 46 in the water coolant loop for cooling the water from the brine coolant loop. Similarly, a heat exchanger 47 shown as a cooler in FIG. 3 is included in the brine coolant loop for cooling by the propane gas coolant loop and further heat exchangers 48 and 49 cooling the propane coolant loop by liquid and gaseous nitrogen respectively in the nitrogen coolant loop 43.

The respective coolant paths for the coolant loops are designated by the same numerals used for the coolant loop blocks and are designated as follows: for the water coolant loop, a straight continuous line is used; for the brine coolant loop, a heavy dashed line is used; for the propane coolant loop a straight continuous line with heavy dots super-imposed thereon is used; for the liquid nitrogen coolant loop a continuous line with small x's super-imposed thereon is used; and for the nitrogen gas loop a dashed line with arrowheads on each dash is used.

The interconnections of the various coolant loop paths with respect to stages 1 through 7 in FIG. 3 are shown, periodic arrowheads being provided to indicate direction of flow.

OPERATION

Figure 4:
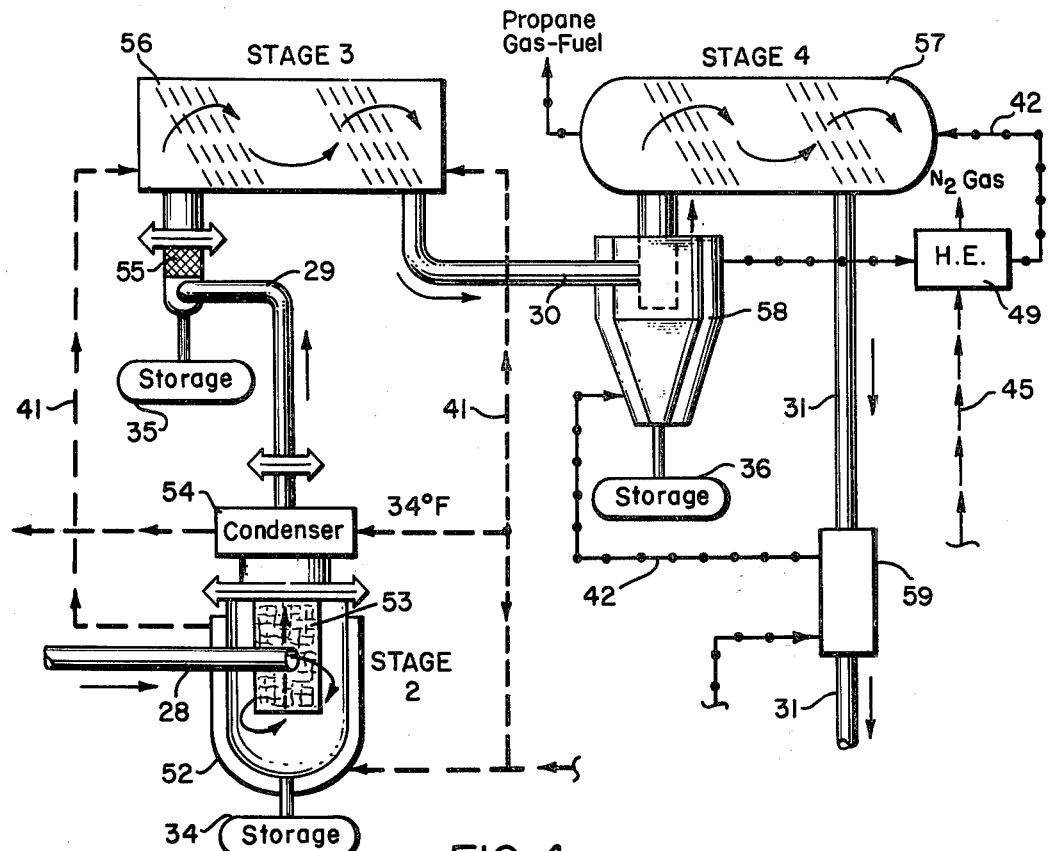
FIG. 4 is a schematic type diagram of certain components making up various stages in the block diagram of FIG. 3; and, FIG. 5 is another schematic diagram of various components incorporated in subsequent stages in the block diagram of FIG. 3.
Figure 5:
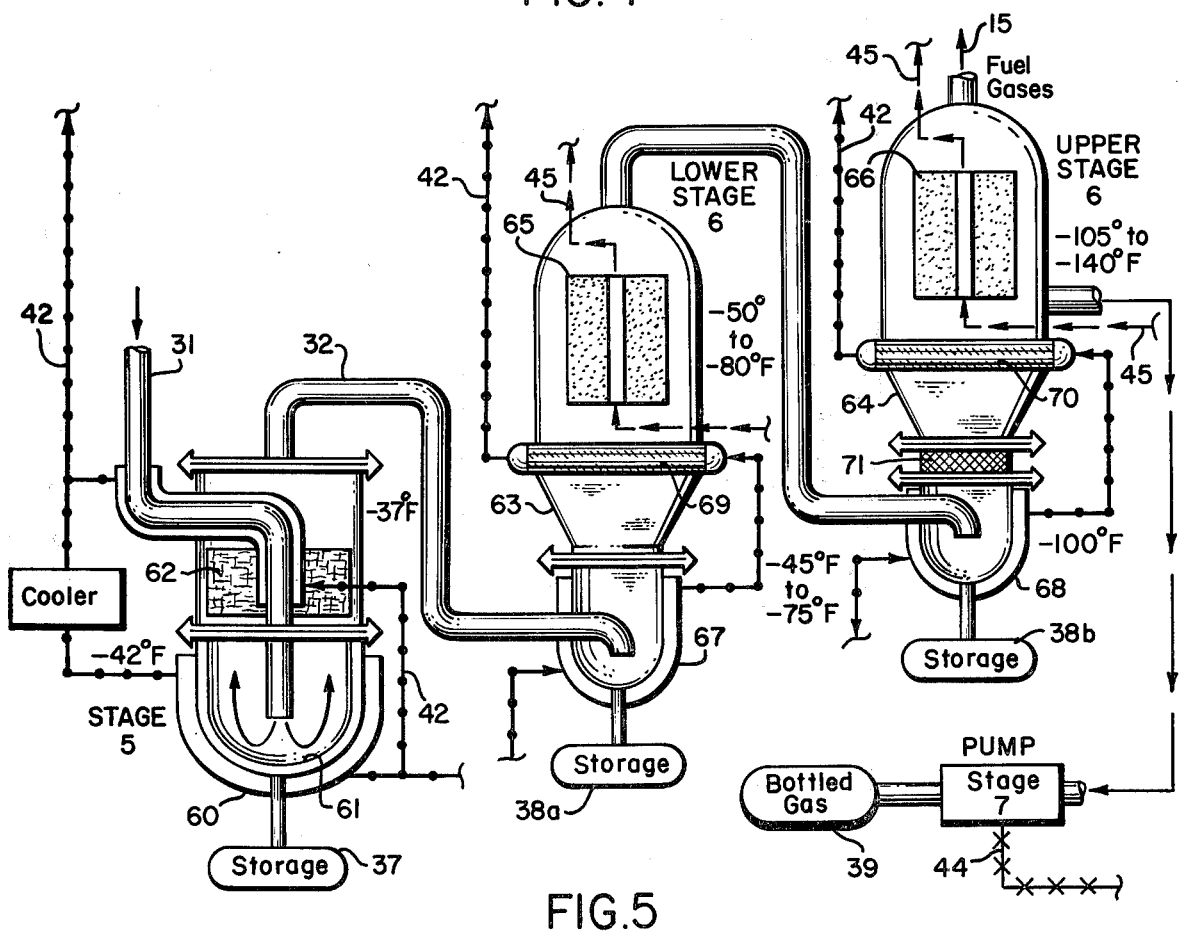

Further details with respect to the treating and removal of pollutants of the gaseous products by the various stages of FIG. 3 can best be described by setting forth the overall operation with reference to the first stage in FIG. 3 and the further detailed showings of subsequent stages in FIGS. 4 and 5.

Briefly, the gaseous products from the booster pump means 24 as described in the upper portion of FIG. 3 pass to stage 1 which is in the form of a vertically oriented heat exchanger 51 connected in the water coolant loop 40 so as to provide a temperature near ambient but below the dew point of condensable vapors thereby removing a substantial portion of water in the gaseous products. The next serially connected stages 2 through 6 include curved flow path defining means for separating out particulate and droplet agglomerations of pollutants by centrifugal force; sub-cooling heat exchange means for sub-cooling the remaining gases in the gaseous product stream; and chemical adsorbing means for removing pollutant remnants of the sub-cooled gaseous products. Details of these latter stages and their cooperation with the various coolant loops will now be described with reference to FIGS. 4 and 5 wherein like numerals have been used to designate corresponding parts already discussed with respect to FIG. 3.

Referring first to FIG. 4, the gaseous products from the heat exchanger 51 of stage 1 described in FIG. 3 pass along piping or conduit 28 into stage 2 which includes a first refrigerated chamber 52 cooled by the brine cooling loop 41. This chamber includes in its upper portion a polymeric mesh material 53 which may comprise polyethylene film scrap, fibers, beads and membranes for removal of benzene homologs which collect in the bottom of the chamber 52 to pass to the accumulator or storage tank 34. In addition, the rising gases move freely through the mesh but the liquid pollutant droplets, having greater inertia, contact the refrigerated walls of the chamber 52 and fall back into the refrigerated lower portion. These contaminant products in addition to the benzene homologs are primarily water and petrochemical.

After passing through the polymeric mesh 53, the remaining rising gases are cooled in a condenser 54 or equivalent heat exchanger cooled by the brine coolant loop 41 this device including refrigerated finned tubes. The liquid brine is at approximately 45° F.

The upwardly moving gases in piping 29 continue through a demister screen 55 and thence into first and second heat exchanging finned passage means 56 and 57 constituting stages 3 and 4 and connected respectively in the brine and propane coolant loops. These two stages not only further progressively cool the flowing gas but define a curved flow path for separation by centrifugal forces of agglomerate pollutants from the gas stream.

More particularly, the gas is tangentially delivered into the first finned passage means or stage 3 at Reynold's numbers ranging from 250,000 to 2,250,000 thus assuring turbulence.

After cooling in the stage 3 finned passage means 56 the gases pass through piping 30 to the cyclone separator 58 and to the second finned heat exchanger means of stage 4. It will be noted that the cyclone separator 58 and finned heat exchanger 57 are both cooled by the propane coolant loop 42.

Within the cyclone separator or vessel 58, the impinging gases are cooled by contact with the refrigerated surface which acts to remove the residual aromatic and certain of the parafinic and unsaturated hydrocarbons. The conical walls of this separator are jacketed to provide a cold refrigerated surface for further hydrocarbon condensation. As the gas velocities are increased, a certain small amount of the condensables are withdrawn at the bottom in accumulator or storage tank 36.

Continuous sub-cooling of the gases from the second finned heat exchanger 57, stage 4, pass through piping 31 towards stage 5, this gas passage including a propane cooled heat exchanger 59 to increase the sub-cooling.

Referring now to FIG. 5, the gaseous products enter stage 5 by way of the piping 31. Stage 5 includes a second refrigerated chamber 60 having a concave floor 61 towards which the gaseous products are directed to effect a 180° turn of the flow. Separation of heavier pollutant products resulting from this 180° turn are collected in the accumulator or storage tank 37, the remaining gases thence passing upwardly through an acid resistant zeolite type molecular sieve bed 62. Continuous further sub-cooling of the gas stream in stage 5 is accomplished by jacketing the inlet piping line 31 as well as jacketing the concave floor 61 of the second refrigeration chamber 60 and passing the propane gas coolant from coolant path 42 therethrough.

The zeolite molecular sieve bed 62 in turn is maintained at a temperature of approximately −37° F. by the propellant cooling path 42 as indicated.

The molecular sieve bed 62 functions to block chlorine gas and secondarily sulfur dioxide by adsorption. When the bed is regenerated by heating, the adsorbed pollutants can be stored in the accumulator 37. Essentially, the gaseous stream from stage 5 after passing through the molecular sieve bed 62 is dry and purified.

This dry gas is passed through piping 32 to stage 6 which constitutes serially connected lower and upper housings 63 and 64, respectively incorporating further molecular sieve beds 65 and 66. These latter molecular sieve beds constitute further chemical adsorbing means for treatment of the gaseous product stream. The housings constituting lower and upper stages of stage 6 are very similarly constructed, respectively including an refrigerated chamber portions 67 and 68 and heat exchangers 69 and 70. The upper housing 64 further includes a demister screen 71 between its associated chamber 68 and heat exchanger 70. The heat exchangers 69 and 70 are cooled by the propane coolant path 42 as indicated. The respective molecular sieve beds 65 and 66 are cooled by nitrogen as indicated at 45. For maximum efficiency, these beds are maintained at from −50° F. to −80° F. for the bed 65 and −105° F. to −140° F. for the bed 66. The bed 65 in the lower stage will adsorb residual sulfur dioxide, residual chlorine and hydrogen sulfide. The bed 66 can be made to collect carbon monoxide and nitric oxide by operating it at temperatures which liquefy methane.

The accumulators or storage tanks 38a and 38b associated with the lower and upper stage housing respectively collect the removed pollutants when the beds are regenerated.

As mentioned heretofore, clean fuel gas can be drawn from the upper housing of stage 6, as indicated at 15. On the other hand, separated nitric oxide and methane in the upper housing 64 below the bed 66 can be withdrawn and subjected to cryogenic cooling in stage 7, as depicted in the lower right hand corner of FIG. 5. Stage 7 essentially comprises a cryogenically cooled vacuum pump which passes the nitric oxide and methane to container 39 for bottling or other use.

In addition to proper insulation of all of the various piping and component parts in the respective stages, the cryogenically cooled items are placed as an assembly within an insulated cold box defined by the dash dot enclosure 50 of FIG. 3. Various connections in the equipment may be fabricated with Marmon type clamping devices in order to provide for ease of maintenance and inspection.

From all of the foregoing, it will be evident that the present invention has provided a vastly improved and thermally efficient gas pollution control system particularly useful for the treatment of gaseous products produced by pyrolytic conversion of materials. In this respect, the materials involved will more often than not include waste materials. However, the invention is applicable to many pyrolytically converted materials other than waste.

While the preferred embodiment as described comprises the seven stages as set forth, lesser or greater numbers of stages could be used. The invention accordingly, is not to be thought of as limited to the specific example set forth for illustrative purposes.

We claim:

1. A method of treating and removing pollutants from gaseous products produced by pyrolytic conversion of materials, including the sequential steps of:
    (a) guiding and imparting a given flow velocity to said gaseous products in a confined insulated environment;
    (b) cooling the flowing gaseous products to a temperature below the dew point of condensable vapors to remove a substantial portion of water in the gaseous products;
    (c) guiding the remaining gaseous products in an upward direction through a polymeric mesh material in a refrigerated emvironment to remove benzene homologs, any additional water, petrochemical pollutant droplets and the like;
    (d) guiding and accelerating the gaseous products along curved paths to effect separation and removal from the system of particulate and droplet agglomerations of pollutants and hydrocarbon liquids by centrifugal force;
    (e) sub-cooling and guiding the remaining gases downwardly and thence through a 180° turn upwardly to separate and remove heavy agglomerates and to pass such gases through an acid resistant zeolite molecular type sieve bed for adsorption of residuals of chlorine gas, sulfur dioxide, hydrogen chloride and oxides of nitrogen to provide a dry gaseous product stream; and,
    (f) further cooling and passing said gaseous product stream through lower and upper stage molecular sieve beds respectively to separate by adsorption any last remnants of carbon monoxide and remove them from the system, and to thereby provide clean fuel gases.

2. The method of claim 1, including the additional step of pumping under cryogenic conditions any accumulated liquefied methane and nitric oxide collected in said upper stage for storage.

3. A gas pollution control system for treating and recovering pollutants from gaseous products produced by pyrolytic conversion of materials, said system comprising:

(a) a series of insulated serially connected equipment stages having an entrance end for receiving, guiding and confining said gaseous products, and an exit end from which pollutant free fuel gas may be drawn for storage or reuse, various ones of said stages having an accumulator for collecting pollutant products separated from said gaseous products;

(b) booster pump means for imparting a flow rate of said gaseous products through said series of equipment stages;

(c) said stages including heat exchange means receiving and cooling said gaseous products to a temperature below the dew point of condensable vapors to remove a substantial portion of water in the gaseous products;

(d) curved flow path defining means for separating out particular agglomerations of pollutants by centrifugal force;

(e) cooling means associated with said series of equipment stages for progressively cooling the gaseous products passing through the stages from a near ambient temperature to cryogenic temperatures to progressively remove energy from the gaseous product stream to thereby separate and enable accumulation of various gases and pollutant products, including means for sub-cooling the heat exchange means for sub-cooling the remaining gases in the gaseous product stream;

(f) chemical adsorbing means for removing pollutant remnants of the sub-cooled gaseous products;

(g) said cooling means including a water coolant loop; a brine coolant loop; a propane coolant loop; and a nitrogen coolant loop including liquid nitrogen for achieving said cryogenic temperatures; and (h) said heat exchange means including a vertically oriented heat exchanger connected in said water coolant loop; a first refrigerated chamber connected in said brine coolant loop for receiving said gaseous products from said heat exchanger and including in its upper portion a polymeric mesh material including polyethylene film scrap, fibers, beads and membranes for removal of benzene homologs, said curved flow path defining means including first and second heat exchanging finned passage means connected respectively in said brine and propane coolant loops and serially receiving the remaining gases from said first refrigerated chamber, said sub-cooling heat exchange means being connected in said propane coolant loop and including a second refrigerated chamber having a concave floor towards which the gaseous products from said second finned passage means are directed to thereby effect a 180° turn of the gaseous flow, said second refrigerated chamber including in its upper portion an acid resistant zeolite type molecular sieve bed, and in which said chemical adsorbing means includes serially connected lower and upper receiving housings each including molecular sieve beds connected in said nitrogen coolant loop, said gaseous products passing therethrough to provide clean fuel gas at the outlet of said upper housing.

4. A system according to claim 3, including vacuum pump means connected to said upper housing and in said nitrogen coolant loop for cryogenic cooling with liquid nitrogen for removing separated nitric oxide and methane and transferring the same for storage and/or other use.

5. A system according to claim 4, including demister screens for aiding in fluid-gas separation positioned at the entrances to said first heat exchanging finned passage means and said upper housing of said adsorption means respectively.

* * * * *